United States Patent [19]

Hesse et al.

[11] Patent Number: 5,096,982
[45] Date of Patent: Mar. 17, 1992

[54] CATIONICALLY MODIFIED NOVOLAKS, PROCESSES FOR THEIR PREPARATION AND THEIR USE

[75] Inventors: Wolfgang Hesse, Taunusstein; Erhardt Leicht, Hofheim am Taunus, both of Fed. Rep. of Germany

[73] Assignee: Hoechst Aktiengesellschaft, Fed. Rep. of Germany

[21] Appl. No.: 433,585

[22] Filed: Nov. 8, 1989

[30] Foreign Application Priority Data

Nov. 10, 1988 [DE] Fed. Rep. of Germany ....... 3838091

[51] Int. Cl.$^5$ ...................... C08F 283/00; C08G 8/28; C08L 61/00
[52] U.S. Cl. .................................. 525/481; 523/417; 523/424; 525/486
[58] Field of Search ................ 525/486, 481; 523/417, 523/424

[56] References Cited

U.S. PATENT DOCUMENTS 4,342,852 8/1982 Takeda et al. ...................... 525/481

Primary Examiner—John Kight, III
Assistant Examiner—T. Mosley
Attorney, Agent, or Firm—Bierman and Muserlian

[57] ABSTRACT

Cationic modification products of novolaks which contain bridging bonds, originating from at least bifunctional epoxide compounds, between the phenolic hydroxyl groups of the starting novolak and the nitrogen atoms of an originally secondary or primary amine and if appropriate additional bridging bonds between phenolic hydroxyl groups and/or between the nitrogen atoms of the amine, it being possible for the amine additionally to carry tertiary amino groups, the nitrogen content in the cationic modification product being between 0.02 and 6% by weight and the weight content of bridging bonds of epoxide compounds being between 1 and 70% by weight, in each case based on the cationically modified novolak.

Process for the preparation of the cationically modified novolaks from the starting novolak, epoxide compound and amine, which are reacted with one another at temperatures between 60° and 200° C., if appropriate in the presence of solvents.

Use of the cationic modification products of novolaks as an additional component in rubber-based moldings or adhesives, and furthermore the use in particular of those products which contain tertiary amino groups, together with crosslinking agents, for the production of shaped articles, flat coatings, putties, adhesive joints, curable molding or sinter compositions, friction linings and laminates and for the preparation of synthetic resin solutions which, after protonation, are water-dilutable and can be used for cataphoretic coatings.

8 Claims, No Drawings

CATIONICALLY MODIFIED NOVOLAKS, PROCESSES FOR THEIR PREPARATION AND THEIR USE

DESCRIPTION

The invention relates to cationic modification products of novolaks which contain nitrogen bonded in heat-stable form. The modification is carried out by addition reactions of novolaks with at least bifunctional epoxy resins and primary or secondary amines, which can moreover also contain tertiary nitrogen atoms.

It is known that phenol and formaldehyde can be reacted in the presence of amines as a catalyst to give self-crosslinking phenolic resins of the resol type. During this reaction, tertiary amines remain unchanged and secondary and primary amines are bonded to the phenol as a Mannich base. Examples are reaction products of phenol with in each case 1, 2 or 3 mol of formaldehyde and dimethylamine to give mono-, di- or tri-dimethylaminomethylene-phenols. These compounds are unstable to heat. The instability is increased by the presence of acid or basic compounds. Phenolic resins prepared in non-stoichiometric ratios also behave in the same way.

Phenolic resins of the novolak type are prepared from phenols and oxo compounds, as a rule aldehydes, and in particular formaldehyde, in the presence of acids. If amines are also used in the synthesis of these polyalkylidenepolyphenols, the reaction between the phenol and oxo compound is either suppressed, or no amine is bonded, or the amine bonded if appropriate during the synthesis, which as a rule takes place at 100° to 120° C., is split off again during the working up to give phenol-free novolaks, which as a rule is carried out at temperatures between 150° and 280° C. in vacuo, and often with the aid of steam. The same is the case if the novolak is prepared in a cumbersome multi-stage process in the presence of amines as the catalyst.

The splitting of aminic nitrogen from novolaks is also known from the crosslinking of novolaks with hexamethylenetetramine. At higher temperatures above the hardening temperature of about 150° C., these split off the nitrogen as ammonia, amines and in another form and are then practically nitrogen-free. The splitting reaction of these Mannich bases is also catalyzed by acids or bases.

Heat-stable amine-modified novolaks which are free from starting substances have not yet been described to date, although many novel properties and possible uses could be expected from such substances because of their cationic properties and their absence of harmful substances.

It has now been found, surprisingly, that cationic modification products of novolaks which contain bridging bonds, originating from at least bifunctional epoxy compounds, between the phenolic hydroxyl groups of the starting novolak and the nitrogen atoms of an originally secondary or tertiary amine and if appropriate additional bridging bonds between phenolic hydroxyl groups and/or between the nitrogen atoms of the amine, the amine preferably additionally carrying tertiary amino groups, the nitrogen content in the cationic modification product being between 0.02 and 6% by weight, preferably between 0.04 and 5% by weight, and the amount by weight of bridging bonds of epoxide compounds being between 1 and 70% by weight, preferably between 2 and 50% by weight, based on the cationically modified novolak, are heat-stable cationic synthetic resins. These can be reacted, without being self-crosslinking and without additions of catalysts, with a number of crosslinking substances which do not act on non-cationically modified novolaks to give high molecular weight substances which can be used in many ways, in particular as coatings, molding compositions, adhesives and putty. They can additionally be rendered watersoluble by protonation. These cationically modified novolaks can also be used without crosslinking agents and differ from the usual novolaks in that they impart novel properties.

Starting substances or intermediate products which are used for the cationically modified novolaks are amines, epoxide compounds and novolaks. These condensation products of oxo compounds and phenols which are at least bifunctional towards oxo compounds are employed as the novolaks. The starting molar ratio of phenols and oxo compounds can be varied within wide limits of between 1:0.05 to 1:1.0, preferably between 1:0.2 to 1:1.0. They are prepared in the customary manner. After the condensation, the starting novolaks are freed from the unreacted starting substances at temperatures between 150° and 280° C., preferably in vacuo and if appropriate with the aid of steam. Starting substances which are used for the novolak are phenols, such as, for example, phenol, resorcinol, hydroquinone, pyrocatechol, cresols and their isomer mixtures and p- and o-monoalkylphenols having alkyl radicals of 2 to 18 carbon atoms. Instead of the alkyl radicals, aralkyl radicals having 8 to 12 carbon atoms or corresponding alkenyl radicals can be present. Phenols or cresols or p-alkylphenols having 3 to 12 carbon atoms are preferred. Mixtures of the phenols mentioned can also be employed.

Aldehydes are preferably reacted as oxo compounds with the phenols to give the novolak. The number of carbon atoms in the oxo compounds is preferably between 1 and 12. It is also possible to employ mixtures of the aldehydes. The use of formaldehyde is particularly preferred.

The starting novolaks largely or completely freed from their starting substances have a preferred number-average molecular weight of 200 to 2000, in particular 305 to 1500.

Epoxide compounds which are used are, for example, those such as diepoxybutane or diepoxypolyalkylene oxides or the epoxidation products of unsaturated compounds, for example of unsaturated fatty oils or unsaturated hydrocarbons. The reaction products of bis- or polyalkylidenephenols with epichlorohydrin, preferably those of bisalkylidenephenols, such as, for example, diphenylolpropane, having epoxide equivalent weights of preferably 43 to 1000, in particular 112 to 750, are preferred. Epoxide compounds which can be obtained by reaction of bisphenols with epichlorohydrin are preferred. Mixtures can also be used.

The amines used for the cationic modification are secondary or primary amines having hydrocarbon radicals of between 1 and 18 carbon atoms. They can carry one or more primary or secondary amine functions. Those amines which additionally also carry at least one tertiary amino group are preferred. Those amines in which the tertiary amino group carries two methyl groups are particularly suitable. Preferred examples which may be mentioned are dimethylaminopropylamine, dimethylaminopropylmethylamine, dimethylaminopropyl-hydrox-yethylamine and dimethylaminobutylamine. It is also possible to use mixtures.

The cationically modified novolaks are prepared, for example, by simultaneous reaction of the three starting components mentioned. It is advantageous here for a mixture of novolak(s) and epoxide compounds initially to be introduced into the vessel and for the amines to be allowed to run in. Solvents may be present.

It is essential to maintain high reaction temperatures when carrying out the preparation reaction. In fact, it has been found, surprisingly, that cationically modified novolaks can be synthesized only if relatively small amounts of epoxide compounds and amines are employed, even at relatively low temperatures of about 60° to 80° C. With higher amounts of epoxide compounds and amines, however, especially in the case of amines of higher basic strength, such as, for example, the amines which additionally carry tertiary amino groups, the batches gel at temperatures between 60° and 80° C. Only an increase in the reaction temperature into a range from 100° to 200° C. enables non-crosslinked resins to be prepared with such contents of amines which allow the development of cationic properties to move into the foreground. In a given batch, the viscosity and melting point of the reaction product decrease as the reaction temperature increases. This behavior was not predictable and was in contrast to specialist knowledge. The reaction temperatures are therefore preferably in the range from 60° to 200° C., in particular from 100° to 200° C. and particularly preferably from 120° to 190° C.

The cationically modified novolaks according to the invention also have useful properties as additives to rubber-based adhesive compositions without the use of crosslinking agents. In particular, the novolaks which are prepared on the basis of alkylphenols and are cationically modified according to the invention increase the tackiness of non-polar rubbers, such as, for example, natural rubber. In adhesive compositions based on polychloroprene adhesive, they improve the open time, the tackiness and the heat resistance. In polar rubbers, such as, for example, nitrile rubber and polyurethane rubber, cationically modified novolaks from unsubstituted phenols can also be used. The tackiness in particular, and in the case of polyurethane rubber additionally the heat resistance, are favorably influenced here.

A precondition for crosslinking of cationically modified novolaks with the crosslinking agents which are customary for non-modified novolaks, such as, for example, hexamethylenetetramine, phenolic resols, melamine resins and the like, is the presence of an adequate number of nuclear hydrogen atoms on the phenolic nucleus in the ortho- and/or para-position. Substitution of the novolaks by alkyl radicals such as takes place when alkylphenols are used exclusively or are also used in both cases reduces or impedes crosslinkability. Provided these conditions exist, cationically modified novolaks can be crosslinked in the same way as non-modified novolaks. However, the rate of crosslinking is greatly increased in comparison with hexamethylenetetramine, phenolic resols and melamine resins. Thus, cationically modified novolaks can advantageously be employed with hexamethylenetetramine for increasing the heat resistance in nitrile rubber adhesive compositions.

However, cationically modified novolaks may also react with substances which cannot be used for the customary novolaks, crosslinking taking place. For such reactions, which are described below, the novolak radical must contain no reactive nuclear hydrogen atoms. The cationically modified novolaks crosslink in particular with maleic acid, fumaric acid and phthalic anhydride and particularly preferably with maleic anhydride, at temperatures from 120° C., preferably between 140° and 170° C.

Epoxide compounds such as those already mentioned above are particularly suitable as crosslinking agents. The crosslinking can already take place at room temperature or below. The addition of catalysts is not necessary. Increasing the crosslinking temperature to 120° to 200° C., preferably 140° to 180° C., accelerates the crosslinking and brings it to completion.

The crosslinkings can be carried out in one stage or stepwise. Because of the advantageous position of the softening points of the modified cationic novolaks, free-flowing non-blocking sinter compositions which can be ground or shaped intermediate products can be obtained, these being suitable, for example, for coatings and glueings or as binder for pulverulent or fibrous substrates. The cationically modified novolaks and the crosslinking agents can also be used in solution or a melt, for example for putty. For certain uses, for example as a reinforcing resin for rubber, the cationically modified novolaks and their crosslinking agents can be mixed simultaneously or in succession into the substrate to be reinforced.

Cationically modified novolaks can be rendered watersoluble by protonation. They can first be reacted in solution, without addition of catalysts, with formaldehyde to give self-crosslinking phenolic resins. This enables water-dilutable synthetic resin solutions to be prepared, for example for lacquers, which can be plasticized, if appropriate, by addition of customary substances. The lacquers can also be deposited cataphoretically.

In the following examples, parts (p) always denotes parts by weight and % denotes percentage by weight. The syntheses are carried out in glass or metal reactors which are equipped with heating, cooling, stirrers, thermostatic control, reflux condensers, descending condensers and a vacuum device.

EXAMPLE 1

Cationically modified novolak 1.1 Preparation of a starting novolak from phenol and formaldehyde 940 parts of phenol, 9.4 parts of oxalic acid and 500 parts of aqueous formaldehyde (30% strength) are boiled under reflux for 3 hours. The volatile contents are then removed, initially under normal pressure and then under a waterpump vacuum-rising up to a bottom temperature of 220° C. This temperature is maintained for a further hour. 700 parts of a novolak having a melting point of 48° C. and a content of 0.05% of free phenol are obtained.

1.2 Reaction to give the cationically modified novolak 700 parts of the starting novolak obtained from Example 1.1 are heated to 150° C., 161.4 parts of a liquid epoxy resin based on diphenolpropane and epichlorohydrin and having a viscosity number of 22,000 mPa.s/25° C. (measured 1:1 in butylglycol) and an epoxide equivalent weight of 190 (Beckopox EP 140 from Hoechst AG) are added and 400 parts of butylglycol are added as the solvent. 21.7 parts of dimethylaminopropylamine are allowed to run in all at once at 150° C. During this operation, the temperature increases spontaneously to 162° C. The mixture is stirred for a further hour at this temperature. The solvent is then distilled off, initially under normal pressure and then under a waterpump vacuum, rising up to a bottom temperature of 210° C. Both fractions are collected separately. Both fractions are amine-free. After cooling to 160° C., the batch is emptied. 900 parts of a modified novolak which has a capillary softening point (m.p.) of 67° C. and a viscosity number of 1350 mPa.s/20° C. (1:1 in butylglycol) are obtained. The residue of the resin is 100% after 1 hour at 170° C.

1 3 Variation of the reaction temperature

The reaction between the novolak, epoxy resin and amine is carried out as described under Example 1.2, but with the difference that the temperature is in each case 60, 80, 100, 120° or 180° C. during addition of the amine.

The 60° C. batch gels 30 minutes after addition of the amine. The 80° C. batch gels during working up, after removal of about 20% of the solvent.

The resin properties which result at the other temperatures, such as the capillary softening point (m.p.) and the viscosity number (mPa.s/20° C.), measured 1:1 in butylglycol, are shown in the following Table 1:

TABLE 1

| Temperature during amine addition (°C.) | m.p. of the resin (°C.) | Viscosity number (mPa · s/20° C.) |
|---|---|---|
| 100 | 70 | 2450 |
| 120 | 68 | 2000 |
| 180 | 68 | 1250 |

The resin prepared at 150° C. contains 0.69% of nitrogen, determined by the Kjeldahl method, a content of 0.67% of nitrogen being calculated.

EXAMPLE 2

Cationically modified novolak 2.1 Preparation of the non-modified novolak 940 parts of phenol, 710 parts of aqueous formaldehyde (30% strength) and 15 parts of oxalic acid are reacted with one another as described in Example 1.1 and the mixture is worked up. 888 parts of a novolak having a melting point of 80° C., a viscosity of 1200 mPa.s (1:1 in butylglycol) and a content of free phenol of 0.1% remain in the reactor.

2.2 Preparation of the cationically modified novolask 888 parts of the novolak of Example 2.1 remaining in the reactor, 205.2 parts of the epoxy resin used in Example 1.2 and 27.5 parts of dimethylaminopropylamine are reacted with one another as described in Example 1.2 and the mixture is worked up. 1118 parts of a cationically modified novolak having a viscosity number of 12,000 mPa.s/20° C. (1:1 n butylglycol) and a melting point of 94° C. are obtained.

EXAMPLE 3

Cationically modified novolak, variation of the amounts of reactants 412 parts of the novolak from Example 1.1 are prepared using varying amounts, which can be seen from the following Table 2, of the epoxy resin (ep resin) from Example 1.2 and varying amounts of dimethylaminopropylamine (DMAPA) in the presence of 280 parts of butylglycol as in Example 1.2, but at 120° C., and are then worked up as described in Example 1.2. The resin properties obtained by this procedure (m.p. and viscosity number) are summarized in the following Table 2.

TABLE 2

| Example No. | Content of EP resin (parts) | Content of DMAPA (parts) | m.p. of the modified resin (°C.) | Viscosity number (mPa · s/ 20° C.) |
|---|---|---|---|---|
| 3.1 | 142.5 | 25.5 | 79 | 4900 |
| 3.2 | 285 | 25.5 | 80 | 4300 |
| 3.3 | 71.25 | 12.75 | 62 | 2400 |
| 3.4 | 142.5 | 12.75 | 77 | 3810 |

EXAMPLE 4

Cationically modified novolak based on paracresol 540 parts of paracresol, 5.4 parts of oxalic acid and 82.5 parts of paraformaldehyde (91% strength) are boiled under reflux for 3 hours and the mixture is then worked up as described in Example 1.1. 400 g of a paracresol novolak having a melting point of 50° C. are obtained. After distillation, the resin is dissolved in 234 parts of methoxypropanol, 81 parts of the epoxy resin from Example 1.2 are added and 11 parts of dimethylaminopropylamine are also added to the mixture at 150° C. 485 parts of a modified novolak having a melting point of 77° C. and a viscosity number of 600 mPa.s/20° C. (1:1 in butylglycol) are obtained.

EXAMPLE 5

Cationically modified novolak 413.7 parts of an epoxy resin based on diphenylolpropane and epichlorohydrin and having an epoxide equivalent weight of 950 (Beckopox EP 301 from Hoechst AG) and 412 parts of the novolak from Example 1.1 are dissolved in 276 parts of butylglycol, and 12.75 parts of dimethylaminopropylamine are also added to the solution at 180° C. After the reaction mixture has been worked up as described under Example 1.2, 837 parts of a cationically modified novolak having a softening point of 77° C. and a viscosity number of 8200 mPa.s/20° C. (1:1 in butylglycol) are obtained.

EXAMPLE 6

Preparation of a cationically modified novolak based on nonylphenol 6.1 220 parts of para-iso-nonylphenol, 33 parts of paraformaldehyde (91% strength) and 5 parts of oxalic acid are subjected to a condensation reaction at temperatures between 105° and 115° C. for 5 hours until, after 7 hours, the content of unreacted formaldehyde is 1.2%. The batch is then initially heated under normal pressure up to a bottom temperature of 220° C., using a descending condenser. The unreacted nonylphenol is removed from the batch by vacuum steam distillation. 212 parts of a nonylphenol novolak having a melting point of 62° C. and a viscosity number of 30 mPa.s/20° C. (1:1 in xylene) remain.

6.2 After the resin melt from Example 6.1 has cooled to 160° C., 100 parts of industrial diethylbenzene (Solvesso 200 from Esso AG) and 27.3 parts of the epoxy resin from Example 1.2 are added, and 1.14 parts of dimethylaminopropylamine are added at 160° C. Working up of the reaction mixture as described in Example 1.2 gives 238 parts of a resin which has a melting point of 82° C. and a viscosity number of 77 mPa.s/20° C. (1:1 in xylene).

EXAMPLE 7

Cationically modified novolak based on nonylphenol 212 parts of the novolak obtained from Example 6.1 and modified with nonylphenol are melted, the melt is heated to 130° C. and first 57 parts of the epoxy resin from Example 1.2 and then 12.9 parts of dibutylamine are admixed to the melt. After being stirred for ¼ hour, the batch is heated to 160° C., and after a further hour is removed from the reactor. 280 parts of a modified novolak having a melting point of 80° C. and a viscosity number of 92 mPa.s/20° C. (1:1 in xylene) are obtained.

EXAMPLE 8

Sinter resin composition of cationically modified novolak and epoxy resin 3000 parts of an epoxy resin based on diphenylolpropane and epichlorohydrin having an epoxide equivalent weight of 830, a softening point (m.p.) of 74° C., a glass transition temperature ($T_G$) of 55° C. and a viscosity number of 510 mpa s/20° C. (40% strength in butyldiglycol) (Beckopox EP 303 from Hoechst AG) and 600 parts of the modified novolak from Example 1.2 are coarsely ground and the mixture is extruded in a laboratory extruder (manufacturer Werner and Pfleiderer, type ZSK 28) at an intake temperature of 80° C. and a discharge temperature of 113° C. and at a speed of 4 kg/hour.

The extrudate is ground to a particle size of 60 to 80 μm, sieved and discharged satisfactorily onto bonder sheet metal. After a stoving time of 30 minutes at 170° C., the layer thickness is 60 μm. The stoved lacquer film has an Erichsen indentation according to DIN 53156 of 10.0 mm and withstands a load of 160 pounds per square inch on the front and reverse on impact testing in accordance with ASTM D 2794. The stoved lacquer film is resistant to butyl acetate, alkalis and acids. The glass transition temperature ($T_G$) of the stoved lacquer film is 115° C.

EXAMPLE 9

Cationically modified novolaks, variation of the nitrogen content 9.1 412 parts of the novolak used in Example 3 are dissolved in 275 parts of butylglycol and reacted with 23.75 parts of the epoxy resin from Example 1.2 and 3.2 parts of dimethylaminopropylamine as described in Example 1.2 and the mixture is worked up. A novolak having a softening point of 88° C. and a viscosity number of 4400 mPa.s/20° C. (1:1 in butylglycol) is obtained in a quantitative yield.

9.2 412 parts of the novolak used in Example 1.1 are dissolved in 275 parts of butylglycol and reacted with 190 parts of the epoxy resin from Example 1.2 and 25.5 parts of dimethylaminopropylamine from Example 9.1 and the mixture is worked up. A resin having a softening point of 77° C. and a viscosity number of 3200 mPa.s/20° C. (1:1 in butylglycol) is obtained in quantitative yield.

9.3 Crosslinking with epoxy resin, lacquer technology testing 111.4 parts of the novolak from Example 9.1 or 179.1 parts of the novolak from Example 9.2 or 103 parts of the novolak from Example 2.1 used in Example 2.2, which is not modified, are dissolved in butylglycol to the extent of 50% strength and these solutions are stirred with in each case 190 parts of the epoxy resin from Example 1.2. The resulting clear lacquer solutions are drawn in a wet film thickness of 200 μm onto glass plates and the lacquer films are heated at 150° C. for 30 minutes. Tough and hard, well-crosslinked lacquer films which have a glass transition temperature ($T_G$) of 104 or 102° C. and which are resistant to butylglycol for longer than 24 hours are obtained with the novolaks from Examples 9.1 and 9.2. No crosslinking takes place with the novolak from Example 2.1 and the lacquer film remains smeared.

EXAMPLE 10

Crosslinking properties of cationically modified novolaks in comparison with non-modified novolaks For qualitative and quantitative comparison of the crosslinking properties of modified cationic novolaks and for further comparison with non-modified novolaks, the novolak according to Example 2.2 and its starting novolak are each ground in a mortar in the weight ratios shown with the crosslinker substances which can be seen from the following Table 3 and the B time (minutes or seconds) is measured at 150° C. in accordance with DIN 16916-2. A horizontal dash in Table 3 means that no crosslinking takes place.

TABLE 3

| Crosslinking agent | Weight ratio of novolak: crosslinking agent | B time at 150° C. | |
|---|---|---|---|
| | | Novolak modified according to Example 2,2 | Starting novolak |
| Hexamethylene-tetramine | 9:1 | 50 seconds | 3 minutes |
| Hexamethoxy-methylmelamine | 6:4 | 5 minutes | 6 minutes |
| Paraformaldehyde 91% strength | 9:1 | 20 seconds | — |
| Trioxane | 9:1 | 1.5 minutes | — |
| Maleic anhydride | 9:1 | 20 seconds | — |
| Fumaric acid | 9:1 | 1.8 minutes | — |
| Phthalic anhydride | 9:1 | 1.5 minutes | — |

COMPARISON EXAMPLE 1

Novolak from phenol, formaldehyde and dimethylaminopropylaminopropylamine as the catalyst 940 parts of phenol and 18.8 parts of dimethylaminopropylamine are heated to 100° C. and 243 parts of aqueous 37% strength formaldehyde are added dropwise to the mixture at this temperature in the course of 15 minutes. 3 hours after the start of the formaldehyde feed, the formaldehyde content is 0%.

300 parts of xylene are added and water is removed from the batch azeotropically by circulation. During this procedure, the temperature rises to 148° C. 205 parts of an aqueous phase separate out. The mixture is then distilled, initially under normal pressure and then in vacuo at 200° C. in the course of 1 hour.

After cooling to 160° C., the batch is removed from the reactor. 454 parts of a phenol novolak having a viscosity of 560 mPa.s/20° C. (50% strength in butylglycol) and a melting point of 56° C. are obtained. The nitrogen content determined by the Kjeldahl method is less than 0.05%, and is below the detection limit.

If the amine had been bonded, the nitrogen content of the resin would be about 1%.

We claim:

1. A cationic modification product of a novolak resin, which contains bridging radicals originating from at least bifunctional epoxy compounds, between the phenolic hydroxyl groups of the starting novolak and the nitrogen atoms of an originally secondary or primary amine and optionally additional bridging radicals originating from at least bifunctional epoxy compounds between phenolic hydroxy groups and/or between the nitrogen atoms of the amine, which amine may additionally carry tertiary amino groups, and the nitrogen content in the cationic modification product being between 0.02 and 6% by weight and the total content of bridging radicals originating from at least bifunctional epoxy compounds being between 1 and 70% by weight, based on the cationically modified novolak resin.

2. A cationic modification product of a novolak resin as claimed in claim 1, wherein the starting novolak used was a condensation product of a phenol, which is at least difunctional towards oxo compounds, and oxo compounds, which condensation product has been largely or completely freed from its starting substances and has a number-average molecular weight of between 200 and 2000.

3. A cationic modification product of a novolak resin as claimed in claim 1, in which the epoxide compound used for the bridging radicals had an epoxide equivalent weight of between 43 and 1000, and had optionally been prepared by reaction of a bis- or polyphenol with epichlorohydrin.

4. A cationic modification product of a novolak resin as claimed in claim 1, in which the amine used as the modifying agent was a diamine which contained a secondary or primary amine function and a tertiary amine function, the tertiary nitrogen optionally being substituted by methyl groups.

5. A process for the preparation of a cationically modified novolak resin as claimed in claim 1, which comprises reacting the starting novolak, the epoxide compound and the amine with one another at temperatures between 60° and 200° C. optionally in the presence of solvents.

6. A rubber based molding or adhesive containing novolak resin as claimed in claim 1.

7. A member of the group consisting of shaped articles, flat coatings, putties, adhesive joins, curable molding and sinter compositions containing a cationic modification product of a novolak as claimed in claim 1 optionally containing tertiary amino groups, together with cross-linking agents selected from the group consisting of hexamethylenetramine, paraformaldehyde, trioxane, maleic anhydride, maleic acid, fumaric acid, phthalic anhydridde, epoxy resins, melamine resins and phenolic resins of the resol type.

8. A synthetic resin solution which is water-dilutable after protonation containing a cationic modification product of a novolak resin of claim 1 optionally containing tertiary amino groups and optionally together with the cross-linking agents of claim 7.

* * * * *